Figure 5:
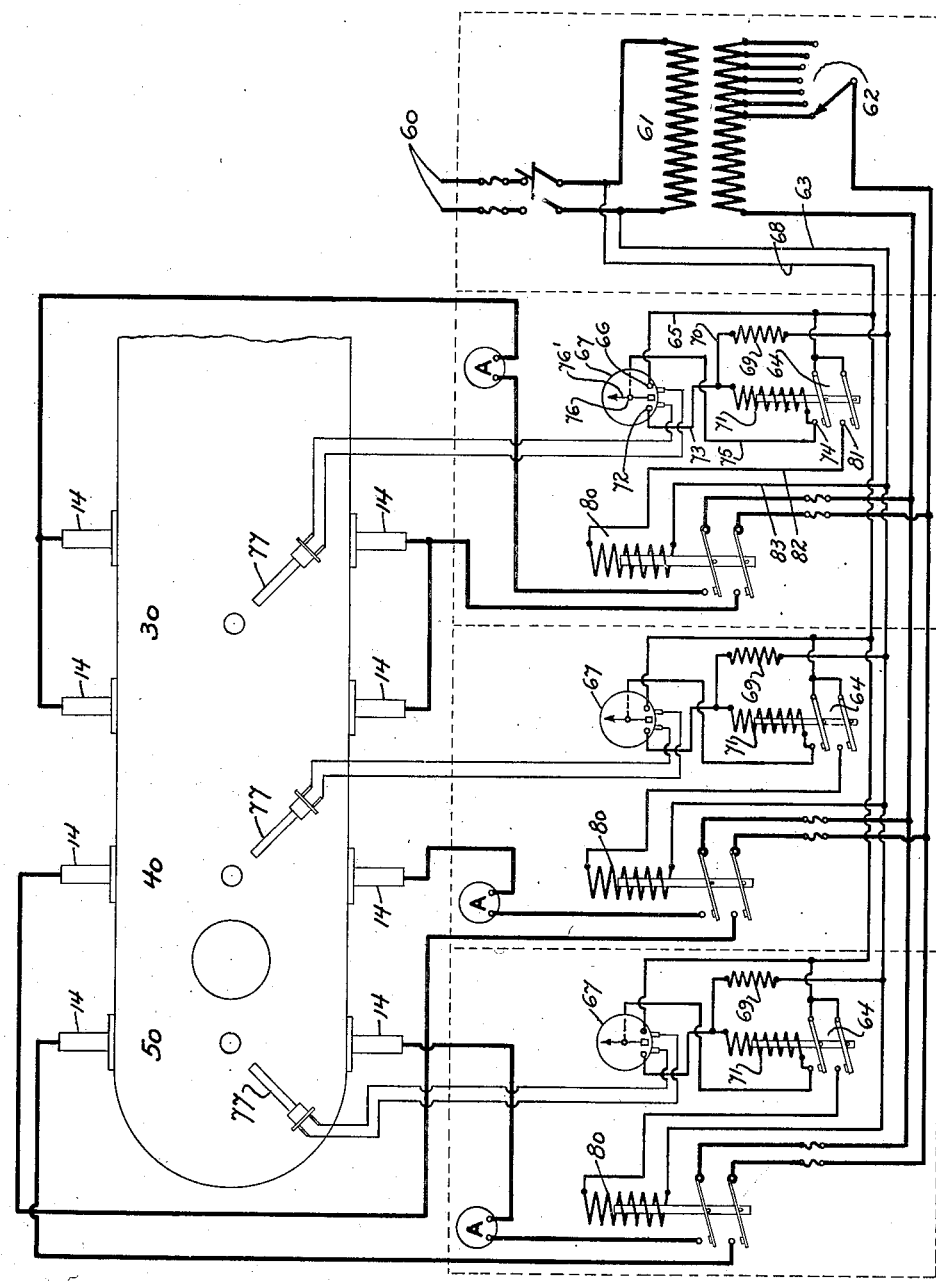

Sept. 26, 1933.  K. M. HENRY  1,928,288
FOREHEARTH FOR MOLTEN GLASS AND METHOD OF CONTROLLING
THE TEMPERATURE OF THE GLASS THEREIN
Filed April 29, 1930  4 Sheets-Sheet 1
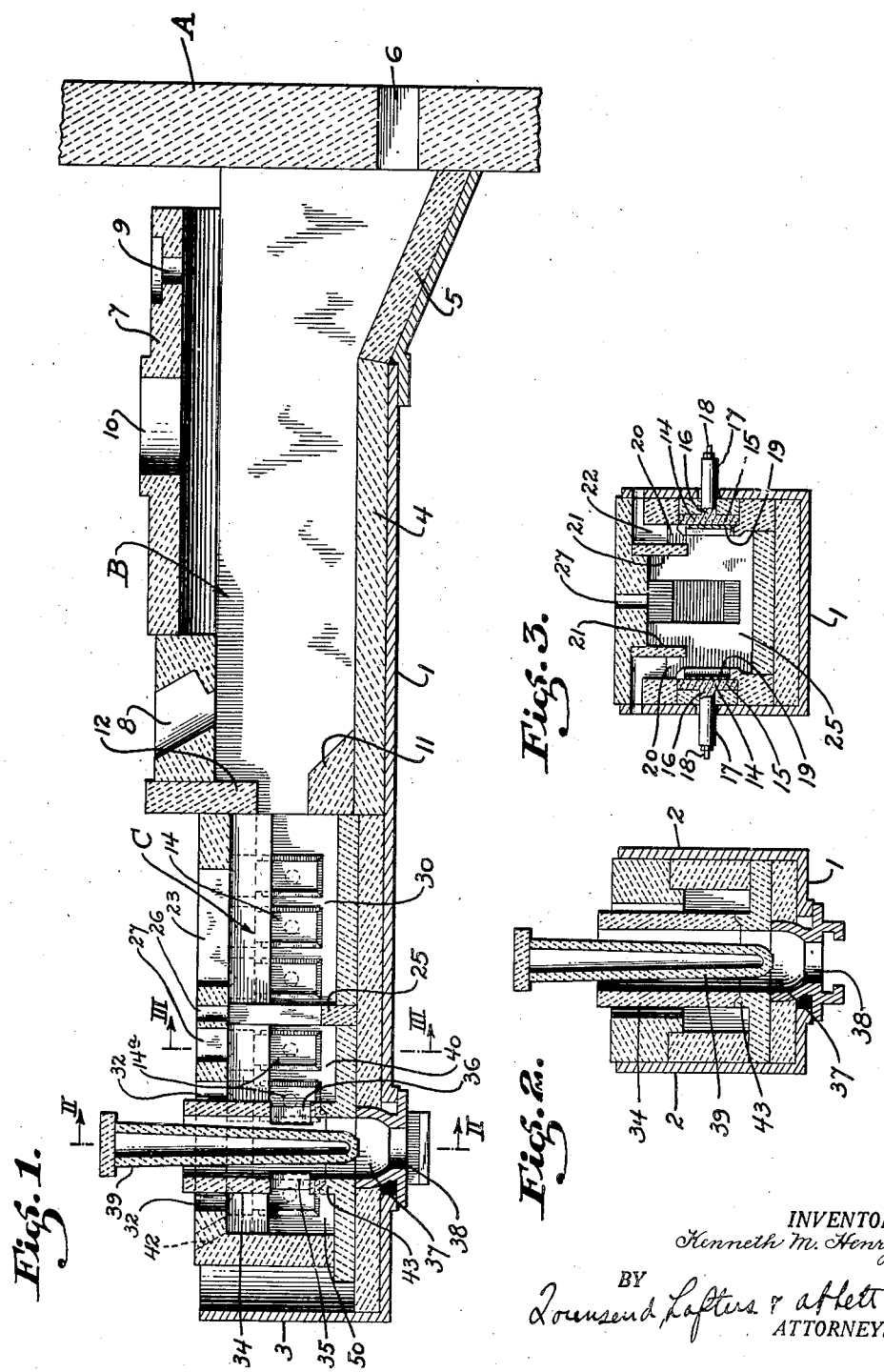
INVENTOR.
Kenneth M. Henry.
BY
Townsend, Lafters & aflett
ATTORNEYS.

Sept. 26, 1933.  K. M. HENRY  1,928,288
FOREHEARTH FOR MOLTEN GLASS AND METHOD OF CONTROLLING
THE TEMPERATURE OF THE GLASS THEREIN
Filed April 29, 1930   4 Sheets-Sheet 2
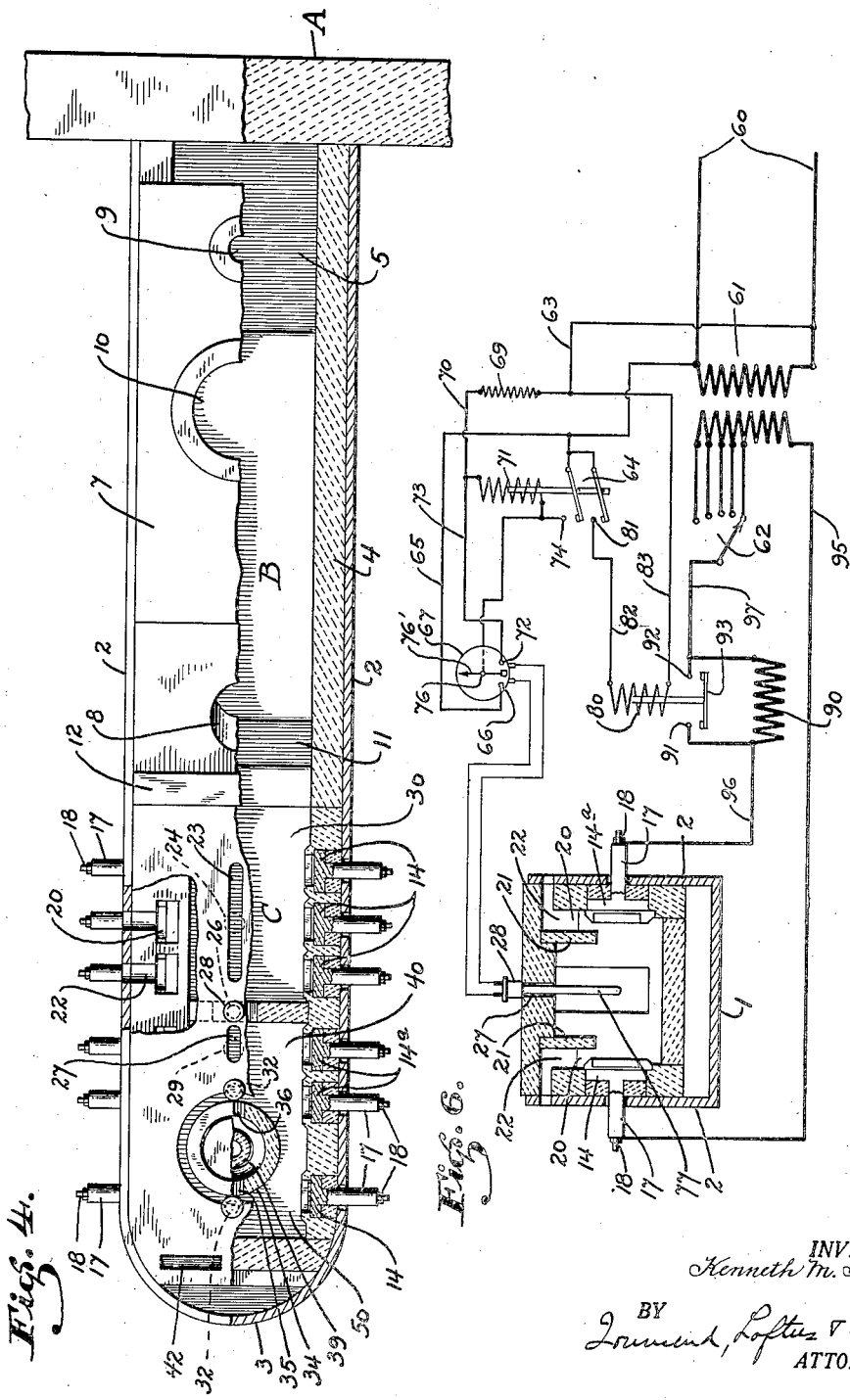
INVENTOR.
Kenneth M. Henry
BY
Townsend, Loftus & Skett
ATTORNEYS.

Sept. 26, 1933. K. M. HENRY 1,928,288
FOREHEARTH FOR MOLTEN GLASS AND METHOD OF CONTROLLING
THE TEMPERATURE OF THE GLASS THEREIN
Filed April 29, 1930 4 Sheets-Sheet 4
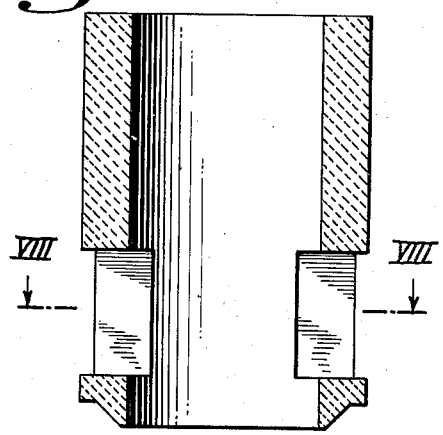
Fig. 7.
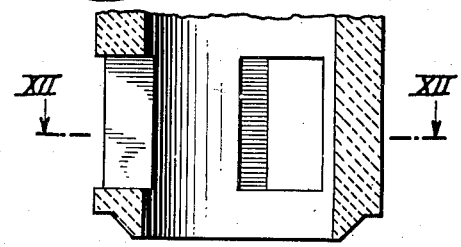
Fig. 11.
Fig. 12.
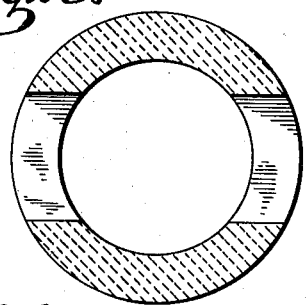
Fig. 8.
Fig. 13.
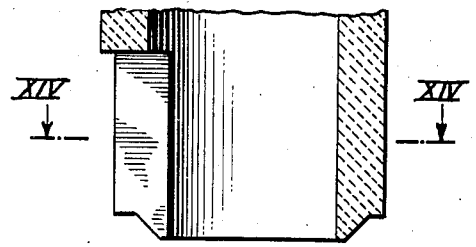
Fig. 9.
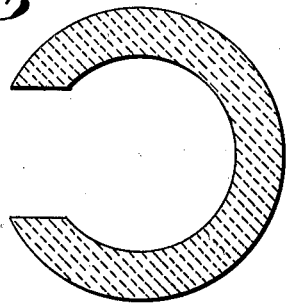
Fig. 14.
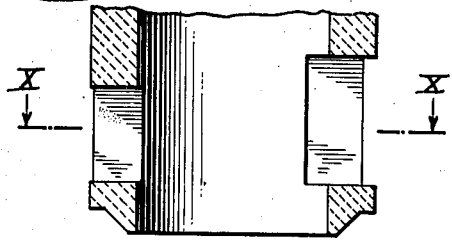
Fig. 10.
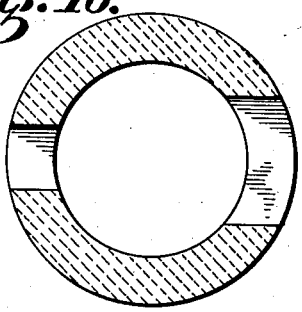
INVENTOR.
Kenneth M. Henry.
BY
Townsend, Loftus & Abbett
ATTORNEYS.

Patented Sept. 26, 1933

1,928,288

UNITED STATES PATENT OFFICE 1,928,288

FOREHEARTH FOR MOLTEN GLASS AND METHOD OF CONTROLLING THE TEMPERATURE OF THE GLASS THEREIN

Kenneth M. Henry, San Francisco, Calif., assignor, by mesne assignments, to Hartford-Empire Company, Hartford, Conn., a corporation of Delaware Application April 29, 1930. Serial No. 448,241

16 Claims. (Cl. 49—55)

This invention relates to a glass furnace and especially to a boot or fore-hearth therefor and to a method of controlling the temperature of the glass therein.

In the production of glass bottles by the suspended charge feeding process, the control of temperature is of great importance. If the temperature could be accurately and automatically controlled, many of the problems incident to the manufacture of bottles would be solved.

In order that the results of improper control may be readily seen, consider the following:—

One of the most important features of a bottle is its capacity. During the first stages of manufacture, a charge of molten glass is directed into the molds of the blowing machine and since the molds are of fixed capacity, it follows that if a given size bottle is made at a certain weight the capacity will be correct, but any deviations from that weight will result in incorrect capacities. If the charge of glass is heavier than the predetermined figure, the resulting bottle will be of short capacity, and conversely, if the charge is light, the bottle will be long in capacity. Furthermore, the differences of capacity for a given deviation of weight are magnified the smaller the capacity of the bottle.

The part temperature plays in the process is of great importance. The first point to be noted is that viscosity is directly dependent upon temperature. The lower the temperature the greater the viscosity, the final limit being solid glass. On the other hand, viscosity is reduced with elevations in temperature. It should be further noted that within the temperature range at which molten glass is formed into bottles, the viscosity curve is very steep, which naturally means that a slight change in temperature entails a relatively large change in viscosity.

With the foregoing statement of facts in mind, operation of the feeder should be considered. Perhaps the first consideration is the diameter of the charge, or gob as it is sometimes called. The diameter of the charge is to be determined by the size of the opening of the blank mold on the forming machine, and the charge preferably is just large enough to slip into the blank mold. Obvious difficulties are encountered if the charge is too large and conversely just as serious trouble is encountered if it is too small. To get the correct diameter, a series of orifice rings are used which are attached to the outlet of the feeder and which vary in increments of $\frac{1}{16}$ of an inch. The proper orifice ring is selected and the next step is to get the proper weight of glass. This is accomplished by adjusting the length of the charge. The length is to be determined within fairly narrow limits by the length of the blank mold. The proper length of glass is obtained by timing the shears which cut off the stream issuing from the orifice. As long as the diameter and length of the charge remain constant, the weight of glass will always remain the same, as the specific gravity of the glass does not change. In the foregoing, it has been assumed that adjustments were made at a given temperature with the result that all of the conditions were fulfilled as long as the temperature remained constant. Suppose the temperature drops a few degrees. Now it will not be possible to get the same amount of glass through the orifice because the viscosity has increased, with the result that the charge will be shortened and the weight decreased. In practice, this situation may be met by increasing the interval between the shear cuts, thereby allowing a longer time for the flow of glass through the orifice, and thereby obtaining the correct weight of glass in the charge. Since all the operations of forming the charge into a bottle are necessarily synchronized, this change involves a slowing up of production. On the other hand, if the temperature increases, the viscosity decreases and the weight increases with a lengthening and narrowing of the charge. To correct this condition, the speed is increased. It has been found in practice that all of the moving parts of the feeder and forming machine are inter-related in their action, and that if adjustments are made for one speed and this speed is changed, then the inter-relation is destroyed. The feeder should accordingly be readjusted, but this in practice requires considerable manipulation of adjusting mechanisms to maintain substantial uniformity of weight of the finished bottles. The net result is to keep the average weight of the bottles nearly the same, but structural defects are engendered to a greater or less degree, because of the frequent variations in the shape of the charge. In order to blow a structurally good bottle, the shape of the charge should never vary and should closely approximate that of the blank mold. Changes of speed, as noted above, change the shape of the charge. Consequently it is desirable in order to blow uniformly good bottles that the speed of operation remain constant at that for which all of the adjustments have been properly set.

In conjunction with the speeding up or slowing process, the operator of the feeder also has some control over the temperature by adjusting the flame which is used to heat the bath of molten glass. This is done in the usual manner by admitting more or less fuel by means of the usual valve arrangement. In actual operation, as soon as the operator sees his glass is too hot, he reduces the flame and speeds up the machine. Under the new conditions, the glass will gradually become cooler and then the speed of the machine will be too great. This sequence of speed and temperature variation continually goes on as long as the apparatus is in operation.

From the above, the reason for close control of temperature should be apparent.

The object of the present invention is to generally improve and simplify the construction and operation of glass furnaces and especially the boot or fore-hearth thereof; to provide a fore-hearth which is divided into two main sections or zones wherein the molten glass is first cooled and then raised to a predetermined higher temperature before it is discharged therefrom; to provide means for electrically heating the glass in the heating zone; to provide means for preventing stratification of the molten glass into zones or layers of different temperatures; and further, to provide means for automatically maintaining the molten glass at a predetermined temperature at the point of discharge.

The fore-hearth is shown by way of illustration in the accompanying drawings, in which:

Fig. 1 is a central vertical longitudinal section through the fore-hearth and the forward end of the furnace to which it is attached, Fig. 2 is a cross section taken on line II—II of Fig. 1, Fig. 3 is a cross section taken on line III—III of Fig. 1, Fig. 4 is a plan view of the fore-hearth partially in section, Fig. 5 is a diagrammatic view showing the automatic electric control whereby the temperature of the molten glass at the point of discharge is maintained, Fig. 6 is a diagrammatic view similar to Fig. 5 showing a modified form of electric control, Fig. 7 is an enlarged vertical central section of the cylinder which controls flow of glass to the discharge bowl according to the construction shown in Fig. 1.

Fig. 8 is a cross section taken on line VIII—VIII of Fig. 7,

Figs. 9 and 10 show a modification of the lower end of the cylinder to the extent that ports of uneven area are shown, Figs. 11 and 12 show another modification to the extent that three ports are disclosed through which the molten glass enters the cylinder, Figs. 13 and 14 disclose still another modification in which a single port is employed.

Referring to the drawings in detail and particularly Figs. 1 to 4, inclusive, it will be stated that the fore-hearth consists of a built-up cast iron trough consisting of a bottom section 1, side sections 2, and a forward or end section 3. This trough, or boot, as it is commonly called, is lined with a refractory material such as fire clay which resists the action of glass and heat. The boot is supported by means of rods extending from the buck stays of the melting furnace or by brackets or the like not here shown. The boot is divided into two zones or sections generally indicated at B and C which will hereinafter be referred to as the cooling and heating sections.

For proper control of the glass discharged from the boot it is necessary to have the glass behind the heating section below the temperature desired in the charge. This is done because it is possible to obtain more accurate control in heating glass than in cooling it. As the glass may be hotter than desired when entering the boot from the glass furnace, it is first necessary to partially cool the molten glass and then to increase the temperature to that required before it is discharged.

The cooling section B is lined with a refractory material such as indicated at 4. The rear end, that is, the end nearest the glass furnace, slopes as indicated at 5 to a submerged throat 6 formed in the breast wall A of the furnace. The roof of the cooling section consists of an arch cover tile 7 and in this cover are placed two surface combustion gas burners such as indicated at 8 and 9. These burners are used when the boot is being heated up and also to bring the temperature of the glass up to a point where it will form a conductor. They are also used as an auxiliary source of heat if the temperature of the glass when entering the boot is so low that the glass will not carry the necessary current to produce a heating effect. In the event of power failure these burners would also be turned on in order to keep the glass and boot hot. In the tile 7 is formed an opening 10 which is adapted to be connected with a stack, not here shown, so as to carry away the combustion gases to the outside atmosphere. When the burners are not in operation this opening is also used as a means for controlling the degree of cooling of the glass when necessary. When large glassware is being manufactured the greater volume of glass passing through the boot brings in more heat to be dissipated. When this occurs burner 8 is removed and by the natural draft created by the stack cold air is introduced which cools the glass. It will be understood that the stack should be provided with a damper so as to regulate the amount of cooling air thus employed. At the front end of the cooling section is a block 11 which is used to deflect the current of glass in an upward direction. The glass entering through the throat 6 is usually hotter than desired and it is desirable to prevent glass of too high a temperature from flowing along the bottom of the boot to the discharge orifice and thereby causing loss of control. The deflector block 11 directs the moving stream of glass upwardly and to that extent prevents stratification of the molten glass into layers of different temperature.

Directly above the deflector block 11 is another deflector block 12 which projects downwardly into the glass. This block has a three-fold function; first, it directs the upper portion of the moving glass stream into the lower portion thereby causing a mixing of the hot and cool glass; secondly, it acts as a skimmer to keep back any deleterious matter that may have formed on the surface of the glass or any material previously introduced into the glass which might later rise to the surface; and third, it separates the upper portion of the cooling zone from the heating zone, thus stopping any air currents which might otherwise enter the heating zone. The function of the two deflector blocks is quite important as it is necessary to have the stream of glass move in the proper channel, their main function being that of preventing stratification due to temperature gradients in the glass stream.

The cool glass enters the heating and controlling section indicated at C. This section is divided into three or more zones, each independently controlled. These zones are indicated at 30, 40 and 50. Zone 30 is next to the cooling section and it is insulated on all sides. This is done to conserve heat and also to stabilize temperature conditions. If molten glass were introduced into a furnace that was perfectly insulated all parts of the glass stream would be at the same temperature. Attempts are accordingly made to obtain this condition as closely as possible because uniformity of temperature throughout the glass stream is exceedingly important. First, it prevents stratification of the glass into temperature zones with its attendant lack of control; and secondly, it prevents uneven distribution of temperature in the charge. Uneven temperature distribution would result in a bottle of varying wall thickness. This latter feature is almost as essential as that of weight control.

By referring to Figs. 1, 3, and 4, it will be noted that electrodes such as indicated at 14 are placed in the side walls of zone 30. These electrodes are placed in opposition to each other and three sets consisting of pairs are illustrated in the present instance but it will be understood that more or less may be used as conditions may demand. Electrodes in actual use consist of a graphite plate such as indicated at 15 into which is screwed a graphite rod 16. Shrunk around the graphite rod is a tube 17 which may be made of steel or any other heat resisting metal. The purpose of the tube is to prevent the graphite rod from oxidizing and it also acts as a terminal for the electric connections which are made at 18. The steel tube also gives mechanical strength to the electrode as a whole. The graphite plate 15 is coated with an electrode material 19. This coating completely covers the graphite in order that none of it shall be exposed to the flowing glass stream. The electrodes are placed in recesses formed in the refractory material for the purpose of protecting the coating 19 from erosion by the flowing stream of glass. By having the electrodes disposed in recesses as shown the faces 19 are maintained out of contact with the main moving stream, thus prolonging the life of the coating. The space between the cast iron side wall 2 of the boot and the graphite plate with its tube 17 is filled with a cement or like material to keep the air from oxidizing the graphite and the tube.

Positioned above the electrodes 14 are blister traps generally indicated at 20. When the furnace here shown was first placed in operation difficulty was encountered in that the glass discharged was found to contain a streak of blisters or bubbles. These blisters are bubbles of gas caught in the glass and these constitute a serious defect in a finished bottle of glassware. Inspection showed that the bubbles were generated at the electrode faces. Research determined that the bubbles were evolved by superheated glass near the faces of the electrodes. The temperature of the electrode faces was approximately 200° F. above that of the glass. This excessive temperature is caused either by a contact resistance or the resistance of the electrode coating. The high temperature destroyed the existing equilibrium of the gas producing matter dissolved in the glass so that gas was evolved, and, being caught in the relatively viscous glass, was retained as bubbles or blisters.

It of course would be desirable to prevent the formation of blisters when using this type of electric heating system by having the glass devoid of any dissolved gas producing matter but at the present time is believed not to be practical.

A remedy accordingly resolves itself into removing the blisters after they are formed and thus preventing them from reaching the gob and the finished bottle. This has been accomplished by use of the blister traps illustrated. The essential feature of the blister traps is a projecting lip or baffle plate such as indicated at 21. This extends downwardly into the flowing glass stream at a point laterally inward from the associate electrodes. Each electrode has its own blister trap and all of these are interconnected by a channel 22. Openings 23 lead from the channel to the atmosphere.

When the boot is in operation the blisters travel upwardly on the faces of the electrodes and into the trap. The glass adjoining the electrode face has a higher temperature than elsewhere in the glass stream and consequently has a lower viscosity. Due to this lower viscosity the blisters rise on the electrode faces as they are formed and reach the surface within the blister trap chamber. Because of the high temperature due to the superheated surface the blisters burst and are completely dispersed as they reach the surface, and the gas discharged from the bubbles passes through the openings and then to the atmosphere. If the openings were not provided gas pressure would develop in the trap chambers and the blisters would then be forced down under the baffle plate 21 and into the main stream of glass. If desired, it is possible to connect the openings with some source of reduced pressure and thus facilitate the removal of the blisters by allowing the then relatively increased pressure within the bubbles to more readily burst the skin of glass surrounding them. This has, however, not been found necessary in practice, since channel 22 is designed to permit the introduction of burners so that the surface of the glass in the traps may be heated to such an extent as to lower the viscosity of the glass, thereby permitting the bubbles to freely burst as they reach the surface.

A brief description of the electrodes and the blister traps employed is submitted in the present instance as the electrodes and the blister traps disclosed form the subject matters of co-pending applications, Serial No. 480,881, filed Sept. 10, 1930, and Serial No. 458,504, filed May 31, 1930.

In connection with zone 30 of the heating section it may be stated that the roof is formed of a flat slab in which a slot 23a has been cut to allow the introduction of a thermo-couple such as shown at 24, this thermo-couple forming a part of the control apparatus hereinafter to be described. The slab forming the roof is constructed of good insulating material and the center of the roof is lower so that it just clears the surface of the flowing glass stream. This is done to cut down the volume of air space above the glass and thereby reduces the possibility of convection currents which would cause a higher heat loss and might also cause a tendency to chill the upper surface of the glass. To conserve all of the heat possible and also to maintain all portions of the glass stream at as nearly the same temperature as possible is the function of the roof construction.

In the exit of zone 30 is placed a deflector block such as shown at 25, Fig. 1, which has a similar function to the deflector blocks 11 and 12. Its function is to get the moving stream of glass in a designated channel. The deflector 25 directs the flow of glass laterally to the center of the boot and up towards the bottom of the electrode 14a. The upper surface of the glass stream is not directed because an opening must be left for the hot gases to pass into zone 30 when gas is in use as an auxiliary fuel.

All that has been said of zone 30 applies to zone 40. Zone 40 is constructed substantially identical to zone 30, the same electrodes are employed, the same method of insulation, the same type of roof, but in this instance two slots are formed therein as shown at 26 and 27 to permit insertion of thermo-couples as shown at 28 and 29. Two electrodes are employed as shown at 14a and blister traps are also employed.

Zone 50 is also substantially identical in construction with the exception that it only employs one pair of electrodes. Also an opening as indicated at 42 is provided in the roof for the introduction of a gas burner, this being employed to heat up the cold boot until the glass is sufficiently hot to conduct current and it is also to be used in case of emergency due to power shut-downs, etc. Slots 32 are formed in the roof and thermocouples 33, Fig. 4, extend therethrough.

Between zones 40 and 50 but not completely separating them is placed a cylinder such as indicated at 34. This cylinder is constructed of clay or a like refractory material and is provided with one or more entrance ports as indicated at 35 and 36. The glass flows through these ports and down into a bowl as shown at 37 and finally discharges through the orifice indicated at 38 where it is cut off by the shears, not shown, to form mold charges. The cylinder 34 surrounds a plunger 39 which has its usual function. The cylinder is open at the top for the insertion of the plunger and the bottom of the cylinder rests on a supporting ring as indicated at 43, this ring being in turn supported by the insulating material shown. The bowl 37 can be replaced without disturbing the cylinder assembly. It should also be pointed out that the cylinder is not made integral with the supporting ring; hence it may be removed or replaced without much loss of time or without disturbing any other part of the boot. A clamp, not shown, engages the top of the cylinder and holds it rigidly on the ring 43. The function of the cylinder is to guide the glass where desired in order that the proper temperature measurements may be made. The cylinder is useful in obtaining a good temperature control of the glass and control of the weight of the charges. Without the use of a cylinder, there would be difficulty in placing thermo-couple in the flow of glass passing through the bowl. If the thermo-couple was placed in the flow that was going to the bowl good results could be obtained but due to conditions not under control the temperature within the mass of glass itself would vary in the vertical plane and possibly in the horizontal. With conditions of that character the position of the flow would change as viscosity is directly dependent upon temperature; hence the glass will flow most readily where the viscosity is the lowest. If the position of the flow did change, the thermo-couple would be in the wrong position and would therefore not provide proper control of the temperature of the stream of glass. The cylinder and the deflectors have proven to be of great advantage as the glass is made to intermix and to flow through the openings or ports 35 and 36 and by placing the thermo-couples in the center of these ports it is possible to accurately measure the temperature and thus to maintain it. If there is any temperature gradient the extent of it is so small that the thermo-couple will correctly record the average temperature.

As will be noted from the drawings, see Fig. 2, the cylinder does not completely seal off the zones 40 and 50 as a space is left on each side of the cylinder so that the glass can flow from the section 40 into the section 50; hence part of the glass stream enters the cylinder through port 35 and part through port 36. The temperature of the glass flowing through the port 35 can be controlled in zone 40 and the temperature of the glass entering port 36 can be controlled in zone 50. This permits control of the temperature distribution because if the temperature should be low at the front of the cylinder it is possible to raise the temperature in zone 50 and this gives a corresponding increase in temperature in the glass that flows into the outer or front portion of the discharge bowl and thence to the discharge outlet. Obviously the same applies to the glass at the back or rearward side of the cylinder as such glass is controlled in zone 40. While Fig. 1 shows two ports of uniform cross section as being formed in the cylinder it is possible to employ three ports or ports of varying diameter and even to employ a single port, these features being illustrated in Figs. 7 to 14, inclusive, which show various modifications of the port arrangement in the cylinder. Thus, the cylinder 34a of Figs. 9 and 10 has ports 35a and 36a which are unequal in width and size; the cylinder 34b of Figs. 11 and 12 has three similar ports 110 which are spaced equi-distant around the periphery thereof; and the cylinder 34c of Figs. 13 and 14 has but a single port which is indicated at 111.

The electric control circuit is best shown in Fig. 5. As will be seen from this figure the electrodes are arranged in pairs across the boot. The glass between the electrodes acts as the resistor medium for generating the heat and completes the electric circuit. Electrical energy is drawn from an alternating current supply means 60 through a transformer 61 which has a tapped secondary 62 which furnishes a variable voltage to the furnace leads. In this instance one transformer with a tapped secondary is shown which supplies energy for all zones in which case all zones operate at the same voltage. Another alternative would be to use a transformer for each circuit and thus permit voltage regulation in each zone.

Referring to the diagram shown in Fig. 5, the electric control circuit will be as follows: Electrical energy is drawn from an alternating current supply 60, through a transformer 61 which has on the secondary side various voltage taps 62 for the electrodes 14 of the furnace. The control circuit is taken from the primary side of the supply 60. As shown in this drawing, wire 68 connects with both contactor arms 64 and through wire 65 with the low side contact 66 of the galvanometer 67. The other side of this circuit is taken through wire 63 from the supply 60 to resistance 69 and through the resistance and wire 70 through the solenoid 71 which is connected with the high side or contact 72 of the galvanometer 67 through wire 73. This circuit continues from wire 70 through the solenoid 71 to one contact 74 of the contactor 64, thence through wire 75 to the common tap or arm contact 76 of the galvanometer 67.

When the glass is below the required temperature the thermo-couple 77 will cause a lower electrical current to flow through the galvanometer 67, thereby moving the arm 76' to the contact 66, which closes a circuit from the supply 60 through wire 63, resistance 69, wire 70, solenoid 71, contact 74, wire 75, contacts 76 and 66, wire 65, and to the other side of the supply 60 by wire 68. The solenoid 71 will now close a circuit through the electrode relay 80 as current flows through wire 68, contactor 64, contact 81, wire 82, the electrode relay 80 and back to wire 63, through the wire 83. The solenoid 71 will keep energized, even though the arm 76' of the galvanometer 67 leaves the contact 66, as current will flow through wire 68 from the supply 60 through contactor arm 64 and across to the contact 74 through the solenoid 71, wire 70, resistance 69, and back to the other side of the supply 60 by wire 63.

When the glass is above the required temperature the thermo-couple 77 will cause a greater current to be generated in the galvanometer 67, thereby moving the arm 76' to engage the contact 72. The circuit which has been maintained from the supply 60, through solenoid 71, wire 70, and resistance 69 will not be broken but will short out the solenoid 71. This is accomplished as follows: From the supply 60 current flows through wire 68, contact arm 64, contact 74, wire 75, contact 76 of the galvanometer 67, the arm 76', contact 72, wire 73, wire 70, resistance 69 and back to the supply 60 by wire 63. Contactor arms 64 will now disengage the contacts 74 and 81 and thereby break the control circuit through relay 80 and electrodes 14. Then as no current is flowing the glass begins to cool off. When the temperature has dropped a few degrees the reverse action takes place closing the circuit from the source of supply to the electrodes 14 with a consequent heating of the glass between the electrodes. Thus, the temperature of the glass is automatically controlled to a predetermined degree within the range of the sensitivity of the controlling apparatus and the design of the furnace.

If the glass should issue from the cooling zone 40 hotter than the temperature set on the instrument in zone 30, the operations would be out of control because there are no means for cooling the glass in zones 30, 40 and 50 with the exception of natural radiation of heat from the glass body; therefore in order to obtain a satisfactory control it is necessary at all times to have glass entering zone 30 at a temperature below that desired for the temperature setting at that point. The same is true when zones 40 and 50 are considered. As the boot is divided into zones it is obvious that the electrodes in each zone are separately controlled as shown in Fig. 5.

It has already been stated that a transformer with variable taps is employed. This transformer is employed as a means to vary and regulate the voltage across the electrodes. The reason for varying the voltage follows: The heating effect of an electric current in a resistor is proportional to the square of the current, the resistance and the time. The resistance of glass varies with the temperature; the hotter the glass the better it will conduct and, conversely, the colder the poorer. Another consideration which does not apply after the furnace is in operation is that glass also follows Ohm's law and this gives a basis for determining the electrical design of the furnace. Thus under definite conditions it is possible to calculate the voltage required to force enough current through the furnace in order to generate sufficient heat to raise the temperature of the glass to the desired point. But due to the fact that the electrical resistance of the glass varies with temperature it is not always possible to meet all the operating conditions with one predetermined voltage and it is for this reason that a tapped transformer is used so as to make it possible to meet varying conditions. For instance if the desired temperature of the glass cannot be maintained because at this temperature the glass will not conduct sufficient current, it is only necessary to change the taps on the transformer to increase the voltage, thus forcing more current through the glass and generating a great quantity of heat.

It will be noted that in certain zones two or more pairs of electrodes are employed. When more than one pair is employed it is only necessary to connect the pairs in parallel circuit as shown in Fig. 5. In other words when two or more pair of electrodes are placed in one zone all are connected to the same circuit and are controlled and actuated by the thermo-couple and the mechanism actuated thereby, all pairs being turned on and off simultaneously. The reason for having more than one pair of electrodes in a zone is to increase the power input in that zone. For instance, if one pair has a given input three pairs will have approximately three times the input at the same voltage. The system so far described is known as an off and on control as the power is either all on or all off. This is of course not the only system that may be employed. For instance, by referring to Fig. 6, it will be noted that a control system is employed wherein, for example, seventy-five percent of the power is on all of the time and the final temperature is controlled by adding or cutting off an additional twenty-five percent of current. In this type of system it is necessary to so regulate the constant input that it will just maintain a constant temperature in the glass lower than the desired temperature at that point; if this were not the case, the temperature would continue to rise and would eventually become so high as to result in complete loss of control.

The control circuit disclosed in Fig. 6 operates the same as shown in Fig. 5, but the electrode circuit is slightly different. When a small amount of current is required, that is, when the molten glass is above the required temperature, the thermo-couple 77 generates or causes more current to flow through the galvanometer causing the contactor arm 76' to move to contact 72 and in doing so shorts the control relay solenoid 71, breaking the circuit to the electrode relay 80, and thereby allowing the circuit to the electrodes to pass through the choke or resistance 90. When the glass is below the required temperature the thermo-couple 77 will generate less current, causing the arm 76' of the galvanometer to engage the contact 66 thereby closing the contact 64 and this in turn completes a circuit to the electrode relay solenoid 80, this solenoid 80 when energized will engage contacts 91 and 92 through the contact arm 93; thence the full amount of current will flow through the electrodes 14, the choke-coil 90 being shorted. The choke-coil will permit approximately seventy-five percent of the current to continuously flow through the electrodes and the molten glass, and the thermo-couple together with the instrument controlled thereby will automatically make and break a circuit so as to maintain the glass at the desired temperature.

While certain features of practical embodiments of the present invention have been more or less specifically described herein, I wish it understood that various changes may be resorted to within the scope of the appended claims. Similarly, that the materials and finishes of the several parts employed may be such as the manufacturer may decide, or varying conditions or uses may demand.

The invention has been described as particularly adapted for use in regulably heating and controlling the temperature of glass but it also is to be understood that such invention may be useful for the heating and control of temperature of soluble sodium silicate (water-glass) and various other similar materials which will serve as a resistance to the flow of electric current therethrough. Furthermore, it will be readily apparent that the invention, so far as it relates to the automatic regulation of the heat applied to the glass according to the temperature of the glass being heated, may be applied to a construction and used in the performance of methods involving the use of other suitable heating means, such as valve-controlled gaseous or liquid fuel burners, instead of the electrical heating means which have been particularly described herein.

Having thus described my invention what I claim and desire to secure by Letters Patent is—

1. The combination with a glass furnace and boot connected therewith, of means for directing a stream of molten glass from the furnace through the boot to a discharge orifice, means dividing the boot into a cooling section and a heating section, means for causing indraft of cool air for cooling the glass in the cooling section, electrodes disposed on opposite sides of the boot within the heating section and arranged in pairs with the molten glass between them as a resistance medium, and temperature actuated means controlled by the temperature of the glass in the heating section for automatically varying an electric current flow through the electrodes and the molten glass to raise the temperature of the glass to a predetermined temperature and to maintain it at said temperature.

2. The combination with a glass furnace and a boot connecting therewith, of means for directing a stream of molten glass from the furnace through the boot to a discharge orifice, means dividing the boot into a cooling section and a heating section, said heating section being divided into a plurality of zones, electrodes disposed in pairs in each zone and at opposite sides of the boot, and means individual to each zone and controlled by the temperature of the glass therein for automatically varying an electric current flow through each pair of electrodes and the molten glass to maintain the molten glass at a predetermined temperature in each zone.

3. The combination with a glass furnace and a boot connecting therewith, of means for directing a stream of molten glass from the furnace through the boot to a discharge orifice, means dividing the boot into a cooling section and a heating section, said heating section being divided into three zones, electrodes disposed in pairs in each zone and at opposite sides of the boot, independently actuated means for automatically varying an electric current flow through each pair of electrodes and the molten glass to maintain the molten glass at a predetermined temperature in each zone, said molten glass when entering the heating section passing first through a first zone, then a second zone, then a third zone, said discharge orifice being located between the second and the third zone, a ported cylinder disposed between the second and the third zone and communicating with the discharge orifice and said molten glass passing from the second and third zones through the ports of the tube into the discharge orifice, a pair of thermo-couples arranged one adjacent each port, and means actuated by the thermo-couples for varying the current flow through the electrodes in the second and third zones so as to maintain the glass discharging through the ports and into the orifice at a predetermined temperature.

4. In a glass furnace having a fore-hearth with a discharge orifice therein, a baffle member having a plurality of ports formed therein through which glass passes to said discharge orifice, and means adjacent to each port for automatically maintaining the glass passing through each port at a predetermined temperature.

5. The combination with a glass furnace having a fore-hearth provided with a discharge orifice, a cylindrical baffle having a port formed therein through which glass passes to said discharge orifice and an electrical thermo-element in the glass stream adjacent said port for measuring the temperature of the glass passing through the port of said baffle, and means actuated by said thermo-element for maintaining the glass passing through the port at a predetermined temperature.

6. That improvement in the art of feeding molten glass through a submerged discharge outlet, which comprises the steps of establishing flow of a stream of molten glass from a source of supply toward the upper end of a downwardly directed discharge passage having its lower end below the level of said glass stream, directing glass from said stream into said discharge passage from a plurality of points spaced around the axial line of said passage, and locally controlling the temperature of the glass passing to said discharge passage from each of said points in accordance with the temperature of the glass adjacent thereto.

7. The method of conditioning molten glass for discharge from a downwardly directed glass discharge outlet, which comprises establishing a flow of a stream of molten glass from a source of supply toward the upper end of said passage, causing said stream to divide and glass therefrom to enter said discharge passage from opposite sides thereof, and locally controlling the temperature of the glass entering the discharge passage at each of said opposite sides thereof according to the temperature of such glass.

8. A forehearth for molten glass comprising a channel for conducting a stream of molten glass from a source of supply toward the outer end of said channel, said channel having a discharge outlet in its base adjacent to its outer end, a baffle in said channel above said discharge outlet for dividing the glass of said stream and for causing glass of said stream to flow in said discharge outlet at points spaced around the axial line of the discharge outlet, and different means for locally heating the glass adjacent to each of said points of passage of glass from the stream to said discharge outlet.

9. A forehearth for molten glass comprising a channel for conducting a stream of molten glass from a source of supply toward the outer end of said channel, said channel having a discharge outlet in its base adjacent to its outer end, a baffle in said channel above said discharge outlet for dividing the glass of said stream and for causing glass of said stream to flow into said discharge outlet at points spaced around the axial line of the discharge outlet, separate means for locally heating the glass adjacent to each of said points of passage of glass from the stream to said discharge outlet, and means for automatically controlling the operation of each of said local heating means in accordance with the temperature of the glass to be heated thereby.

10. A forehearth for molten glass comprising a channel communicating at one end with a source of supply of molten glass and provided adjacent to its opposite end with a downwardly opening passage in its base terminating in a discharge outlet, a substantially cylindrical vertical baffle at the upper end of said discharge passage and axially aligned therewith, said baffle having a plurality of ports in the wall thereof through which glass may flow from said channel into said discharge passage, temperature responsive means adjacent to each of said ports, and separate heating means controlled by said temperature responsive means for locally heating the glass adjacent to the respective ports.

11. A forehearth for molten glass comprising a channel communicating at one end with a source of supply of molten glass and provided adjacent to its opposite end with a downwardly opening passage in its base terminating in a discharge outlet, a substantially cylindrical vertical baffle at the upper end of said discharge passage and axially aligned therewith, said baffle having a plurality of ports in the wall thereof through which glass may flow from said channel into said discharge passage, temperature responsive means adjacent to each of said ports, separate heating means controlled by said temperature responsive means for locally heating the glass adjacent to the respective ports, said temperature responsive means and the heating means controlled thereby acting to bring the temperature of the glass adjacent to each of said ports to a predetermined point whenever the temperature of such glass is substantially below that point.

12. That improvement in the art of feeding molten glass through a submerged discharge outlet for the production of mold charges, which comprises flowing molten glass in a stream from a source of supply successively through a cooling chamber and a continuous series of heating zones to a downwardly opening outlet submerged by glass of the stream, said heating zones and the cooling chamber being separated against heat interchange above the glass level, cooling the glass passing through the cooling chamber to a temperature below the temperature desired for the glass passing through said discharge outlet, and locally heating the glass in each of said heating zones in accordance with variation of the temperature of such glass from a predetermined temperature.

13. Glass feeding apparatus comprising a forehearth having a channel for conducting molten glass from a source of supply in a stream toward the outer end of said channel, said channel having a discharge outlet in its base adjacent to the outer end thereof, means cooperating with the walls of said channel to provide a cooling chamber in the forehearth adjacent to the source of supply of molten glass, and successive heating zones for the remainder of the length of the forehearth, means for separating the cooling chamber from the adjacent heating zone to prevent interchange of heat therebetween above the level of the glass in said channel, separate means for supplying heat locally to the glass in each of said heating zones, thermo-couples individual to said heating zones, and means controlled by said thermo-couples for independently controlling the heating means for the respective heating zones.

14. Glass feeding means comprising a forehearth having a channel for receiving molten glass from a source of supply and for conducting such molten glass in a stream toward the outer end of said channel, said forehearth having a downwardly directed discharge passage in the base of said channel adjacent to the outer end of the latter and terminating at its lower end in a discharge outlet, a cylindrical baffle at the upper end of said discharge passage and in axial alignment therewith, means providing separate heating zones at opposite sides of said baffle, said baffle having ports through which glass may pass from said respective heating zones into the discharge passage, and means individual to each of said heating zones for locally heating the glass therein adjacent to said ports.

15. Glass feeding means comprising a forehearth having a channel for receiving molten glass from a source of supply and for conducting such molten glass in a stream toward the outer end of said channel, said forehearth having a downwardly directed discharge passage in the base of said channel adjacent to the outer end of the latter and terminating at its lower end in a discharge outlet, a cylindrical baffle at the upper end of said discharge passage and in axial alignment therewith, means providing separate heating zones at opposite sides of said baffle, said baffle having ports through which glass may pass from said respective heating zones into the discharge passage, thermo-couples in the respective heating zones in position to be affected by the glass passing through said ports to said discharge passage, and means controlled by said thermo-couples for locally heating the glass in said respective heating zones.

16. A forehearth for molten glass comprising a channel for receiving glass from a source of supply and for conducting such glass in a stream toward the outer end of the channel, said forehearth channel having a submerged discharge outlet in its base adjacent to the outer end thereof, means providing a series of heating zones through which the glass passes in flowing along said channel to said discharge outlet, a pair of spaced electrodes in contact with the glass in each of said heating zones, thermo-couples individual to each of said heating zones and in position to be affected by the temperature of the glass therein, means for supplying electric current to the electrodes in the respective heating zones, said electric current supply means being controlled by said thermo-couples so as to effect an increase in the heat of the glass in any of said heating zones when the temperature of the glass in such zone falls below a predetermined point, and an adjustable transformer connected in circuit with said electric current supply means.

KENNETH M. HENRY.